United States Patent [19]

Blutreich

[11] 4,087,734
[45] May 2, 1978

[54] CHARGING CIRCUIT FOR COMBINATION TROLLEY AND BATTERY POWERED LOCOMOTIVES

[75] Inventor: Joachim N. Blutreich, Ashland, Ky.

[73] Assignee: National Mine Service Company, Pittsburgh, Pa.

[21] Appl. No.: 617,941

[22] Filed: Sep. 29, 1975

[51] Int. Cl.² .............................................. H02J 7/00
[52] U.S. Cl. ......................................... 320/28; 191/4; 320/40; 320/44
[58] Field of Search ........................ 320/39, 40, 44, 45, 320/47, 48; 191/3, 4; 320/2, 3, 5, 7, 17; 320/54, 61, 27, 28

[56] References Cited

U.S. PATENT DOCUMENTS

| | | | |
|---|---|---|---|
| 1,221,753 | 4/1917 | Larson | 320/45 X |
| 3,081,426 | 3/1963 | Bakke | 320/38 X |
| 3,205,422 | 9/1965 | Gold | 320/48 X |
| 3,825,740 | 7/1974 | Friedman et al. | 320/3 X |

Primary Examiner—Robert J. Hickey
Attorney, Agent, or Firm—Stanley J. Price, Jr.; John M. Adams

[57] ABSTRACT

A battery for a combination battery-trolley wire powered mine locomotive is connected at its positive terminal by a conductor to an energized trolley wire that extends through the mine haulageway. A charging contactor having normally open contacts connected to the positive terminal of the battery is connected by a conductor to the negative terminal of the battery. Current from the trolley wire energizes the contactor to close the contacts and supply current to the battery for charging the battery to a preselected voltage level. A voltage sensing apparatus monitors the voltage appearing across the charging contactor. If the voltage exceeds a preselected level for safe charging, one or more Zener diodes is switched to a conductive state to energize a relay coil that actuates a normally closed relay to deenergize the contactor and open the contacts to terminate current flow to the positive terminal of the battery. When the voltage of the battery drops below the maximum safe voltage level, the Zener diode of the voltage sensing apparatus switches to a nonconductive state. The relay coil is deenergized and the relay contact is closed so that current flow from the trolley wire energizes the contactor and current flows through the closed contacts to the battery. An ampere-hour meter monitors the voltage level of the battery and when the battery is charged to full capacity, the ampere-hour meter actuates a normally closed contact associated therewith in the circuit to open the contact and terminate charging of the battery.

9 Claims, 1 Drawing Figure

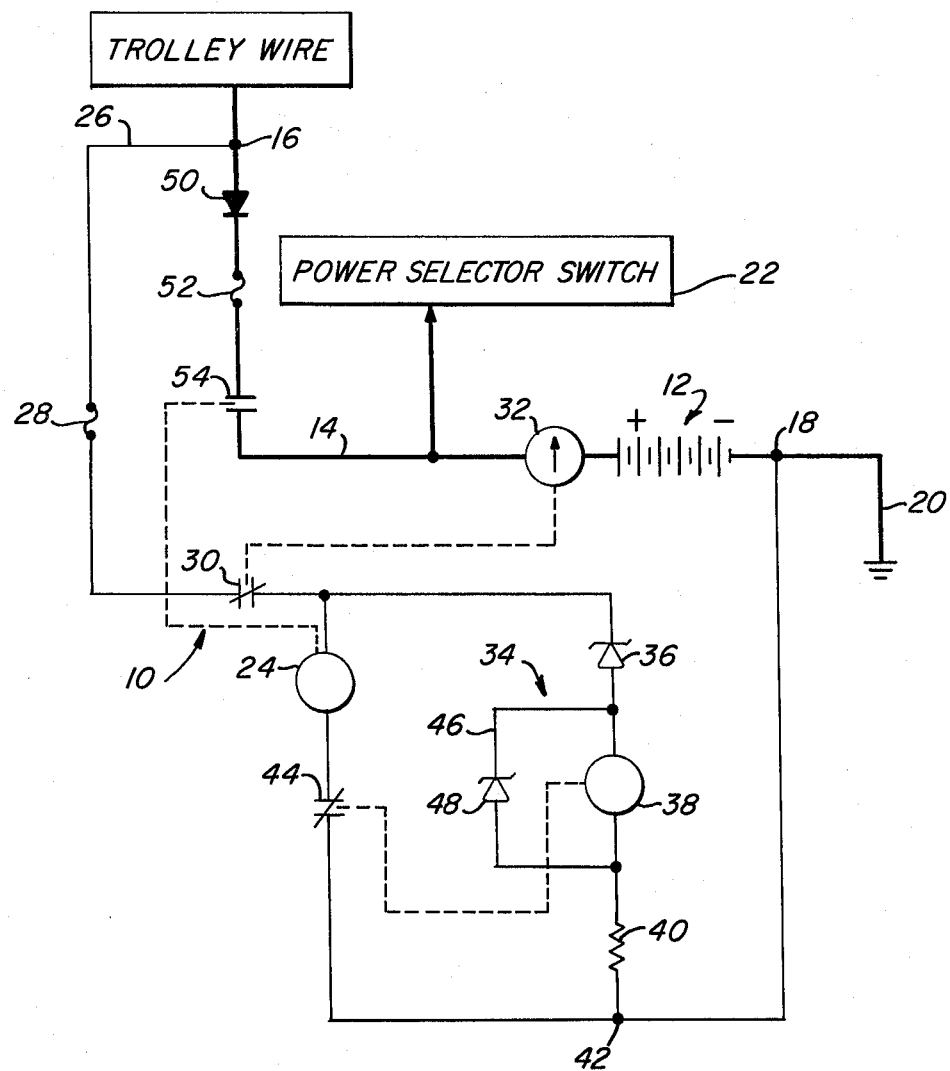

CHARGING CIRCUIT FOR COMBINATION TROLLEY AND BATTERY POWERED LOCOMOTIVES

BACKGROUND OF THE INVENTION

1. Field of the Invention

This invention relates to charging circuitry for a combination trolley wire-battery powered locomotive and more particularly to a charging circuit having a voltage sensing device for monitoring the voltage level of the battery being charged to insure that the battery is charged to a maximum safe level.

2. Description of the Prior Art

Conventional mine locomotives receive power from a trolley wire that is suspended from the mine roof and extends through the haulageway of an underground mine. The energized trolley wire supplies direct current power to the electric motor and propels the mine locomotive on tracks through the mine. The trolley wire is suspended from the mine roof and is continually energized presenting a substantial hazard when equipment comes in accidental contact with the energized wire. Furthermore, trolley wire operation of mining locomotives becomes more troublesome the lower the coal seam becomes because of the limited overhead clearance available for suspending the trolley wire from the mine roof.

One solution to the problems presented by trolley wire operated locomotives is the combined use of trolley wire and battery power for propelling the locomotive. A combination or trolley-battery locomotive utilizes existing trolley wires on the main haulageway. In those locations in the mine where trolley wires do not exist, trolley operation of the locomotive is selectively switched to battery operation. This is particularly adaptable in the side entrys where it is not feasible for economic or safety reasons to install an overhead trolley system.

Because the life of a battery is limited, it must be recharged at periodic intervals requiring either removing the locomotive from operation and substituting a freshly charged locomotive or parking the locomotive during the recharging stage. A combination locomotive on the other hand has the advantage of allowing recharging of the batteries during the interval in which it is on trolley wire operation. If the ratio between trolley and battery operation is sufficiently great, the locomotive need not be parked for the purpose of charging the battery.

One approach to the combination locomotive utilizes a battery having 70 to 90 cells which are recharged when on trolley operation through onboard resistors. Accordingly, the charge current must be kept sufficiently low to prevent excessive heating of the resistors. In addition, a significant decrease in performance occurs when the operation is transferred from trolley power to battery power because of the drop in operation voltage between the two methods of operation.

One means of overcoming the drop in operating voltage between trolley operation and battery operation incorporates placing batteries in series during the trolley operation. This arrangement eliminates the need for an additional resistor when the batteries are then placed in parallel to drive the motors. The motors operate in series when on trolley power and in parallel when on battery power. However, with this arrangement, when one motor fails the other generally fails, too.

There is need for an apparatus for the operation of combination trolley and battery powdered mine locomotives which provides for continuous operation of the locomotive during a shift by transferring operation from the trolley wire to the battery without experiencing a decrease in motor performance. While it has been suggested to provide reliable combination locomotives utilizing trolley and battery operation, the prior art systems experience interruption in the locomotive operation in the recharging of the batteries and distinction in motor performance when transferred from trolley to battery operation.

SUMMARY OF THE INVENTION

In accordance with the present invention, there is provided electrical circuitry for charging a locomotive battery from the voltage of a trolley wire that includes a contactor device provided in the circuit between the trolley wire and the battery. The contactor device is energized to supply direct current power from the trolley wire to the battery to permit charging of the battery to a preselected voltage level. A voltage sensing apparatus positioned in the circuit between the contactor and the battery monitors the voltage level of the contactor device. A monitoring relay is provided for terminating flow of current from the trolley wire to the battery to, in turn, terminate charging of the battery when the charge applied thereto exceeds the preselected voltage value. The voltage sensing apparatus is operable to actuate the monitoring relay and terminate current flow to the battery when the voltage thereof exceeds the preselected value. The voltage sensing apparatus is further operable to continue charging of the battery when the voltage thereof falls below the preselected voltage value.

A timing device connected to the battery between the trolley wire and the battery terminates charging of the battery when a preselected ampere-hour capacity is stored in the battery. When the battery is charged to the full capacity, an ampere-hour meter of the timing device deenergizes a normally closed contact to interrupt flow of current through the contactor device. in this manner, the contactor device is deenergized and the flow of current to the battery is terminated.

The voltage sensing apparatus comprises one or more Zener diodes having a preselected threshold voltage that corresponds to the maximum voltage for safely charging the battery. The Zener diode monitors the voltage appearing across the contactor devices. Should the voltage across the contactor device exceed the threshold voltage of the Zener diode, the diode switches to a conductive state and current flows through the diode to the monitoring relay. A relay coil of the monitoring relay is, in turn, actuated to open a normally closed relay positioned in the circuit between the contactor device and the battery and terminates current flow to the battery. Once the battery voltage falls to below the maximum safe voltage for charging, the Zener diode returns to its nonconductive state and the relay coil is closed to permit continued flow of charging current from the charging contactor to the battery.

Accordingly, the principal object of the present invention is to provide a charging circuit for charging the battery of a combination trolley-battery powered mine locomotive by the voltage on the trolley wire.

Another object of the present invention is to provide a charging circuit for the battery of a trolley-battery powered mine locomotive where one or more Zener diodes control the voltage drawn from the trolley wire and applied to the battery to insure that the battery is charged to a safe level.

A further object of the present invention is to provide a charging circuit that includes one or more Zener diodes that respond to the flow of current from the trolley wire to the battery for charging of the battery and is operable to resume the charging operation when the voltage applied to the battery falls below the maximum voltage for safe charging.

An additional object of the present invention is to provide charging circuitry for a combination trolley-battery powered mine locomotive where the locomotive may be operated continuously for an eight-hour shift without interrupting operation for the recharging the battery.

These and other objects of the present invention will be more completely disclosed and described in the following specification, the accompanying drawing and the appended claims.

BRIEF DESCRIPTION OF THE DRAWING

The FIGURE is a schematic diagram illustrating the charging circuitry for charging the battery of a combination battery-trolley powered mine locomotive.

DESCRIPTION OF THE PREFERRED EMBODIMENT

Referring to the schematic diagram there is illustrated a charging circuit generally designated by the numeral 10 provided to charge a battery 12 of a mine locomotive electrical motor (not shown) for use to power the locomotive when it is not run on a trolley wire. The battery 12 is connected by a conductor 14 to the trolley wire (not shown). The trolley wire is generally positioned in the haulageway of a mine adjacent the mine roof. A trolley pole is mounted on the locomotive and is maintained in contact with the trolley wire to supply direct current from the trolley wire to the locomotive motor for propelling the locomotive on tracks within the mine haulageway.

The positive terminal of the battery 12 is directly connected to the conductor 14, and the negative terminal of the battery 12 is connected by the charging circuit 10 to terminal 16 on the conductor 14. The charging circuit 10 is connected at terminal 18 to the negative terminal of the battery 12 by a ground conductor 20. A power selector switch 22 is connected to the conductor 14 between the battery 12 and the terminal 16. With this arrangement, the locomotive operator may switch between battery operation and trolley operation of the electric motor. Furthermore, when the locomotive motor is operating on the trolley wire, the battery 12 is being charged by the charging circuit 10.

The charging circuit 10 includes a charging contactor such as a relay 24 for controlling contacts 54 provided in the circuit between; terminal 16 and the positive terminal of battery 12. The relay 24 is connected to the terminal 16 by conductor 26 through fuse 28 and contact 30. The contact 30 is operatively associated with an amp-hour meter 32 that is connected to the positive terminal of battery 12. Direct current passes from the trolley wire through terminal 16 to conductor 26 through fuse 28 and the normally closed contact 30 to the relay 24. Relay 24 is energized by the flow of direct current through conductor 26 to terminal 18 and the ground conductor 20.

Once the battery 12 has received a full charge after the charging interval, the amp-hour meter 32 will terminate the charging operation. For example, when a full load of 300 ampere-hours has been stored in the battery 12, the meter 32 energizes the normally closed contact 30 to open the contact 30 and terminate flow of current to the relay 24. This, in turn, deenergizes the coil of relay 24 and terminates the flow of current through contacts 54 to battery 12 and ground conductor 20.

The charging voltage across relay 24 is monitored by the voltage sensing circuit generally designated by the numeral 34. The voltage sensing circuit 34 includes a Zener diode 36 having a preselected threshold voltage connected in series with a monitoring relay 38 and resistor 40 to terminal 42 of conductor 26. The relay 38 includes a relay coil and a normally closed relay contact 44 that is connected to relay 24 on the conductor 26. The monitoring relay 38 is protected against excessive voltages by a shunt circuit 46 that by-passes the relay coil 38. The shunt circuit 46 includes a diode 48 having a preselected threshold voltage.

In operation, when the locomotive is receiving power from the trolley wire the battery 12 is charged by the charging circuit 10. The voltage supplied by the energized relay 24 through contacts 54 to the positive terminal of the battery 12 is monitored by the voltage sensing circuit 34. When a voltage greater than the threshold voltage of Zener diode 36 appears across the relay 24, the diode 36 rapidly switches to a conductive state. Thus, the threshold voltage of the Zener diode 36 may be selected to correspond to the maximum voltage to which the battery 12 may be safely charged. For example, if battery 12 comprises 120 cells having a power capacity of 2.4 volts per battery cell then the battery 12 can safely receive no more than 288 volts. To this end, the Zener diode 36, which may comprise a plurality of Zener diodes connected to the monitoring relay 38 and resistor 40, is capable of protecting battery 12 against trolley voltages higher than 2.4 volts per battery cell.

When an overvoltage condition occurs as sensed by the Zener diode 36 monitoring the voltage across contactor 24, the diode 36 switches to a conductive state. Current then flows from the Zener diode 36 through the monitoring relay 38 and the resistor 40. Flow through the monitoring relay 38 energizes the relay coil thereof and, in turn, actuates the relay contact 44 to deenergize the relay 24 and open the contacts 54 to terminate current flow to the positive terminal of the battery 12.

In this manner, the battery 12 is protected against trolley voltages that exceed the permissible charge per battery cell. Thus, the voltage sensing circuit 34 terminates charging until the voltage drops below the maximum limit for safe charging.

During the period in which the charging operation is terminated by opening of the relay contact 44, the voltage applied to the battery 12 may be consumed. Consequently, a decrease in voltage will appear across the relay 24. The Zener diode 36 being responsive to a decrease in voltage below the value of its threshold voltage will switch to a nonconductive state. Switching the Zener diode 36 to a nonconductive state deenergizes the relay coil 38. This closes the relay contact 44 to energize the relay 24 and close contacts 54 to provide current flow to the positive terminal of battery 12.

During an overvoltage condition when the Zener diode 36 is triggered and the relay coil 38 is actuated, the Zener diode 48 connected across the relay coil 38 serves as a shunt to protect the relay against excessive overvoltages. If the voltage appearing across the relay coil 38 exceeds the threshold voltage of the Zener diode 48, the Zener diode 48 will switch to a conductive state and divert the current flow around the relay coil 38. The additional voltage will appear across the resistor 40 to thereby prevent excessive currents from flowing through the monitoring relay 38 during the overvoltage condition.

As discussed hereinabove, the ampere-hour meter 32 is operable to terminate charging of the battery 12 after a preselected ampere-hour charge has been applied to the battery 12. Accordingly, when the selected capacity of the battery 12 is reached, the ampere-hour meter 32 responds by actuating the normally closed contact 30 to open the contact and terminate the current flow to the relay 24. In this manner, the coil of the relay 24 is deenergized and current flow through contacts 54 ceases to thereby terminate charging of the battery 12. With this arrangement, the trolley pole of the locomotive may remain on the trolley wire and no damage to the battery 12 will result. Further, in accordance with the practice of the present invention, indicator lights may be provided to reveal the occurrence of a low voltage condition, a high voltage condition and a normal voltage condition during periods in which the battery is being charged and periods in which the locomotive is operating on battery power and the voltage stored in the battery is being consumed.

As illustrated in the Figure, the battery 12 is connected to the trolley wire through a blocking diode 50, fuse 52 and the contacts 54. With this arrangement, in the event a loss of trolley power should occur, blocking diode 50, use 52 and contacts 54 are operable to prevent the battery from backfeeding current on conductor 14 to the trolley wire. Thus, no lower limit need be set on the trolley voltage permitting the battery to operate at the trolley voltage without experiencing a significant decrease in the performance of the locomotive motor when transferred from trolley operation to battery operation. This overcomes the problems encountered by the prior suggested combination locomotives in switching from trolley power to battery power.

As discussed hereinabove, the voltage sensing circuit 34 may comprise a plurality or bank of Zener diodes 36 connected in series to establish the maximum voltage for safe charging of the battery 12. For a 120 cell battery having a power capacity of 2.4 volts per battery cell, the maximum voltage for safe charging would be 288 volts. Therefore, to calculate the required voltage value of the Zener diode bank to limit charging above this value, one must consider the voltage drop across the relay coil 38 and the resistor 40. If a total drop of 40 volts appears across the relay coil 38 and the resistor 40, then the Zener diode bank 36 should have a selective threshold voltage no greater than 248 volts to establish the maximum voltage for safe charging. This would be accomplished by serially connecting a 200 volt Zener diode and a 45 volt Zener diode.

In the use of a combination locomotive powered by a battery and a trolley wire, a battery capacity of approximately 2.5 hours for operation at a full load, is considered sufficient for continuous operation of the locomotive during an eight-hour shift. However, severe grades or extensive duty will alter this period of operation for battery capacity. In a eight-hour shift with a 4 to 1 ratio between trolley and battery operation, a 1 ½ ampere-hour capacity of operation at full load is sufficient for battery operation of the locomotive. Assuming that the locomotive motors require 200 amperes at full load, a battery having 300 ampere-hour capacity would be required. Thus, on an operating ratio of 4:1, trolley wire operation to battery operation, during the six-hour period of trolley operation in an eight-hour shift the battery would be charged.

If, for example, during the six-hour period of trolley operation the battery should receive a full load of 300 ampere-hour of charge, the ampere-hour meter 32 would be responsive to the full load and actuate the contact 30 to terminate the flow of current to the battery 12. In the case of lead-acid batteries having a charge rate of 20 amperes per 100 ampere-hours, the full charge rate for this battery would be 60 amperes. Therefore, five hours operation on the trolley wire would provide 300 ampere-hours of charge on the battery 12. This also would provide one hour for the trolley voltage to exceed safe charge limits and still permit complete recharging of the battery. With this arrangement, the locomotive would never have to be removed from operation for recharging during the entire eight-hour shift. The conversion from trolley power to the battery power would not incur a decrease in motor performance because the battery voltage would be matched to the trolley voltage. Only in instances where a locomotive would be ued for more than two of the three shifts, continuous operation would be provided.

With the above described charging circuitry, it is now possible to provide for combined trolley and battery operation of a locomotive motor with the battery being charged to the full capacity of the trolley wire voltage. Furthermore, the voltage sensing circuit 34 of the present invention insures that the battery is charged to the maximum voltage for safe charging. In the event that excessive voltage be applied to the battery, then the charging operation will terminate. Once the charge value returns to below the maximum safe voltage level the charging circuit 10 is restored to operation to continue the charging operation. With this arrangement, the battery charging operation may be turned on and off and the rate of charging controlled.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. An electrical circuit for charging a mining machine battery from the voltage of a trolley wire comprising,
control means connected to said trolley wire and said battery for controlling the supply of direct current power from said trolley wire to said battery to permit charging of said battery to a preselected voltage level,
voltage sensing means for monitoring the level of the voltage of said trolley wire, said voltage sensing means being connected in parallel relation with said control means in said circuit,
a monitoring relay connected in series relation with said voltage sensing means for terminating flow of current from said trolley wire to said battery,
said voltage sensing means being operable to actuate said monitoring relay to terminate current flow to said battery when the trolley wire voltage exceeds a preselected voltage level and to continue current flow to said battery when the trolley wire voltage remains below said preselected trolley wire voltage, and metering means connected to the battery between the trolley wire and the battery for interrupting the flow of current through said control means after a predetermined charging interval to deenergize said control means and terminate the flow of current to said battery after a preselected charge has been applied to said battery.

2. An electrical circuit for charging a mining machine battery from the voltage of a trolley wire as set forth in claim 1 in which said metering means includes, a meter device connected to said battery for measuring the charge of said battery, a normally energized contact positioned between said trolley wire and said control means to provide current flow to said control means, and said meter device being operable after a predetermined charging interval to deenergize said normally energized contact after a preselected charge has been applied to said battery and interrupt current flow to said control means to terminate flow of current to said battery and charging thereof.

3. An electrical circuit for charging a mining machine battery from the voltage of a trolley wire as set forth in claim 1 in which, said voltage sensing means includes a Zener diode connected in series with said monitoring relay, and voltage protection means for preventing flow of current associated with an overvoltage condition through said monitoring relay.

4. An electrical circuit for charging a mining machine battery from the voltage of a trolley wire as set forth in claim 1 in which said voltage sensing means includes, a Zener diode connected in series with said monitoring relay to control the flow of current from said trolley wire to said monitoring relay, said Zener diode having a preselected breakdown voltage above which said Zener diode conducts, and said Zener diode operable to conduct at voltages above said breakdown voltage and permit current flow to said monitoring relay to actuate said monitoring relay and terminate current flow to said battery to protect said battery against voltages that exceed a preselected maximum trolley wire voltage.

5. An electrical circuit for charging a mining machine battery from the voltage of a trolley wire as set forth in claim 1 in which said monitoring relay includes, a relay coil serially connected to said voltage sensing means, and a normally energized relay contact serially connected to said control means operable to deenergize said control means and terminate current flow to said battery for charging said battery.

6. An electrical circuit for charging a mining machine battery from the voltage of a trolley wire as set forth in claim 1 which includes, resistor means serially connected to said voltage sensing means and said monitoring relay, and said resistor means being operable to prevent flow of current associated with an overvoltage condition when said battery has been charged to said preselected voltage level.

7. An electrical circuit for charging a mining machine battery from the voltage of a trolley wire as set forth in claim 1 which includes, blocking means for preventing backfeeding of current from said battery to said trolley wire in the event of loss of power on said trolley wire.

8. An electrical circuit for charging a mining machine battery from the voltage of a trolley wire as set forth in claim 7 wherein, said blocking means includes a blocking diode positioned between said trolley wire and said battery, said blocking diode being operable to prevent current flow from said battery to said trolley wire, and a fuse serially connected to said blocking diode and said battery and operable to interrupt said circuit when the current thereof exceeds a preselected current strength, said control means including a contact serially connected to said blocking diode, fuse, and battery and operable to interrupt current flow from said trolley wire to said battery.

9. An electrical circuit for charging a mining machine battery from the voltage of a trolley wire comprising, control means connected to said trolley wire and said battery for controlling the supply of direct current power from said trolley wire to said battery to permit charging of said battery to a preselected voltage level, voltage sensing means for monitoring the level of the voltage of said trolley wire, said voltage sensing means being connected in parallel relation with said control means in said circuit, a monitoring relay connected in series relation with said voltage sensing means for terminating flow of current from said trolley wire to said battery, said voltage sensing means being operable to actuate said monitoring relay to terminate current flow to said battery when the trolley wire voltage exceeds a preselected voltage level and to continue current flow to said battery when the trolley wire voltage remains below said preselected trolley wire voltage, a shunt circuit bypassing said monitoring relay and having a Zenner diode connected in parallel with said monitoring relay, said Zener diode operable to divert current flow from said monitoring relay when trolley wire voltages above said preselected voltage level are applied to said voltage sensing means, and metering means connected to the battery between the trolley wire and the battery for interrupting the flow of current through said control means after a predetermined charging interval to deenergize said control means and terminate the flow of current to said battery after a preselected charge has been applied to said battery.

* * * * *